(12) United States Patent  (10) Patent No.: US 8,662,382 B2
Baba et al.  (45) Date of Patent: Mar. 4, 2014

(54) NON-CONTACT STORAGE MEDIUM FIXING STRUCTURE AND NON-CONTACT STORAGE MEDIUM HOLDER FIXING STRUCTURE

(75) Inventors: Shunji Baba, Kawasaki (JP); Shigeru Hashimoto, Inagi (JP); Yasushi Kasahara, Inagi (JP)

(73) Assignees: Fujitsu Limited, Kawasaki (JP); Fujitsu Frontech Limited, Tokyo (JP)

( * ) Notice: Subject to any disclaimer, the term of this patent is extended or adjusted under 35 U.S.C. 154(b) by 946 days.

(21) Appl. No.: 12/260,579

(22) Filed: Oct. 29, 2008

(65) Prior Publication Data

US 2009/0199448 A1  Aug. 13, 2009

(30) Foreign Application Priority Data

Feb. 8, 2008 (JP) .................................. 2008-029483

(51) Int. Cl.
*G06F 17/00* (2006.01)
(52) U.S. Cl.
USPC .......................................... 235/375; 235/441
(58) Field of Classification Search
USPC ......... 340/572.8, 693.12; 40/642.02; 439/153
See application file for complete search history.

(56) References Cited

U.S. PATENT DOCUMENTS

| 7,598,877 B2* | 10/2009 | Lionetti ..................... 340/572.8 |
| 2005/0275518 A1* | 12/2005 | Adamson et al. ............. 340/447 |
| 2006/0158340 A1* | 7/2006 | Wilson et al. ............ 340/693.12 |
| 2010/0090013 A1* | 4/2010 | Jung et al. ..................... 235/492 |

FOREIGN PATENT DOCUMENTS

| JP | 2000-030015 A | 1/2000 |
| JP | 2003-234673 A | 8/2003 |
| JP | 2005-301136 A | 10/2005 |
| JP | 2006-209724 A | 8/2006 |
| JP | 2007-164569 A | 6/2007 |

OTHER PUBLICATIONS

Japanese Office Action dated May 29, 2012, issued in corresponding Japanese Patent Application No. 2008-029483, with English translation (5 pages).

* cited by examiner

*Primary Examiner* — Thien M. Le
*Assistant Examiner* — Sonji Johnson
(74) *Attorney, Agent, or Firm* — Westerman, Hattori, Daniels & Adrian, LLP (57) ABSTRACT

A non-contact storage medium fixing structure includes a non-contact storage medium that has a memory unit which stores predetermined information of an object to be controlled, a pair of wire connection guide members respectively provided at at least two positions on a body of the non-contact storage medium, and a wire connection member that fixes the non-contact storage medium at a predetermined position of the object to be controlled, by way of the pair of wire connection guide members.

11 Claims, 8 Drawing Sheets

NON-CONTACT STORAGE MEDIUM FIXING STRUCTURE AND NON-CONTACT STORAGE MEDIUM HOLDER FIXING STRUCTURE

CROSS-REFERENCE TO RELATED APPLICATION

This application is based upon and claims the benefit of priority of the prior Japanese Patent Application No. 2008-029483, filed on Feb. 8, 2008, the entire contents of which are incorporated herein by reference.

FIELD

The embodiments discussed herein are directed to a fixing structure of a non-contact storage medium and a fixing structure of a non-contact storage medium holder.

BACKGROUND

Recently, an automatic recognition system by RFID (Radio Frequency Identification) using an IC tag is in general use in a wide range of field. In the field of logistics, for example, the IC tag is paste-fixed at a predetermined position of an object to be controlled. Information stored in thus paste-fixed IC tag is read out by a reader-writer, whereby individual information such as commodity information and quality information stored in the IC tag is acquired. A commodity control is centrally performed based on the obtained individual information.

As explained above, conventionally, the IC tag is fixed by an adhesive or welding at the predetermined position of the object to be controlled. Therefore, it takes time to remove the IC tag, and additionally, the IC tag once used may not be reused.

To solve such a problem, in an IC tag fixing structure described in Japanese Patent Application Laid-open Publication No. 2007-164569, the IC tag is stored inside an IC tag holder and the IC tag holder is fixed to the object to be controlled. According to this structure, the IC tag is not directly pasted and fixed to the object to be controlled. Further, in an IC tag fixing structure described in Japanese Patent Application Laid-open Publication No. 2005-301136, a metal strap is fixed to the IC tag and the strap is fixed to a fixing part of the object to be controlled.

However, the above IC tag fixing structures have the following problems. Namely, when the metal strap is fixed to the IC tag and further to the fixing part of the object to be controlled, the fixing position of the IC tag can move. Since the fixing position may not be controlled, wireless communication with the reader-writer is disabled, and as a result, necessary individual information is not obtainable. When the IC tag holder containing the IC tag is paste-fixed to the object to be controlled, the fixing position of the IC tag relative to the object to be controlled is difficult to adjust because the object to be controlled varies in its size and may change its positional relationship with the IC tag. When such changes are not responded well, the wireless communication with the reader-writer is disabled.

SUMMARY

It is an object of the present invention to at least partially solve the problems in the conventional technology.

According to one aspect of the present invention, a non-contact storage medium fixing structure includes a non-contact storage medium that has a memory unit which stores predetermined information of an object to be controlled, a pair of wire connection guide members respectively provided at at least two positions on a body of the non-contact storage medium, and a wire connection member that fixes the non-contact storage medium at a predetermined position of the object to be controlled, by way of the pair of wire connection guide members.

According to another aspect of the present invention, a non-contact storage medium holder fixing structure includes a non-contact storage medium that has a memory unit which stores predetermined information of an object to be controlled, a non-contact storage medium holder that stores the non-contact storage medium inside, a pair of wire connection guide members respectively provided at at least two positions on the non-contact storage medium holder, and a wire connection member that fixes the non-contact storage medium holder at a predetermined position of the object to be controlled, by way of the pair of wire connection guide members.

Additional objects and advantages of the invention will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

DESCRIPTION OF EMBODIMENTS

Figure 1:
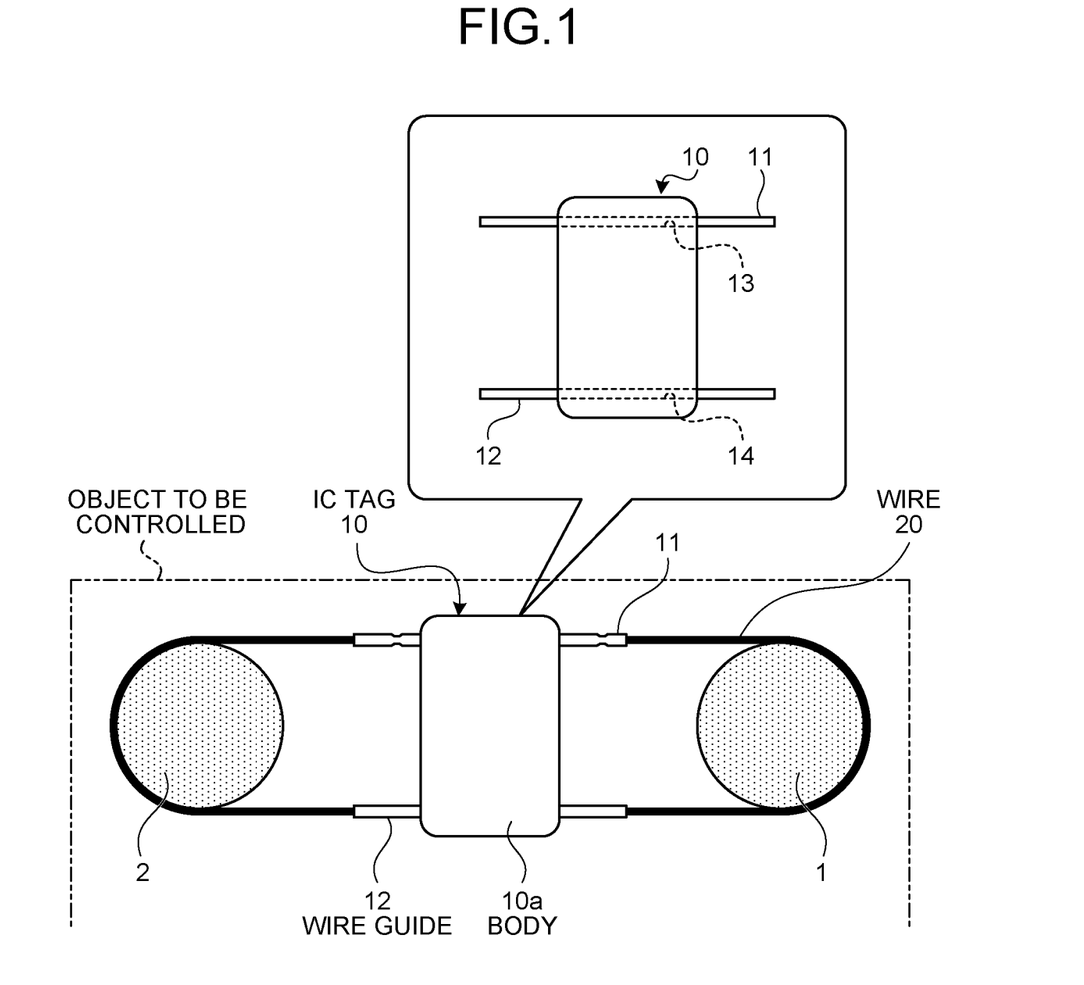
FIG. 1 is an explanatory diagram of an IC tag and an IC tag fixing structure according to a first embodiment.

Exemplary embodiments of IC tag fixing structure according to the present invention will be explained in detail with reference to accompanying drawings. An outline of configuration and fixing structure of an IC tag according to a first embodiment will first be explained. FIG. 1 depicts the outline of the configuration and the fixing structure of the IC tag. An IC tag 10 illustrated in FIG. 1 is a non-contact storage medium which has a memory unit to store information and whose memorized information is read or written by a reader-writer by way of an electric wave. The present invention is not to be limited by the first embodiment explained below.

[a] First Embodiment

--Overall Configuration of IC Tag--

As illustrated in FIG. 1, the IC tag 10 of the first embodiment includes a wire 20 (also referred to as "wire connection member") for fixing the IC tag 10 by winding itself around fixing members 1 and 2 of an object to be controlled and a pair of wire guides 11 and 12 (also referred to as "wire connection guide members") for causing two ends of the wire 20 to pass through through-holes 15 and 16 and for respectively fixing (fixing with caulking) leading edges thereof.

Namely, the IC tag fixing structure of the first embodiment is characterized in being so configured that the wire 20 is looped by fixing (fixing with caulking) one end of the wire 20 to one end of a pair of wire guides 11 and 12 extending from a predetermined position (vertical position) on both side faces of a body 10a of the IC tag 10 and causing the other end of the wire 20 to pass through the through-holes 15 and 16 of a pair of wire guides 11 and 12 and, using this looped wire 20 and the fixing members 1 and 2 provided on the object to be controlled, the IC tag 10 is fixed at a predetermined position of the object to be controlled.

To explain specifically, the body 10a of the IC tag 10 is made of a hard resin material (such as plastics), etc., and is configured to have a thin cross section overall and a quadrilateral shape. At each of two side faces of the body 10a, the wire guides 11 and 12, running through inserting holes 13 and 14 of the body 10a, respectively, are securely arranged. The pair of wire guides 11 and 12 is stick-like member hollow inside and is configured so that the wire 20 runs through inside the through-holes 15 and 16 formed in the wire guides 11 and 12. In the first embodiment, a stainless wire having high strength and flexible characteristics is used for the wire 20.

--Procedure of Fixing IC Tag 10--

A procedure of fixing the IC tag 10 depicted in FIG. 1, will be explained referring to FIGS. 2 to 5. FIGS. 2 to 5 are explanatory diagrams of the IC tag 10 fixing procedures (1) to (4).

Figure 2:
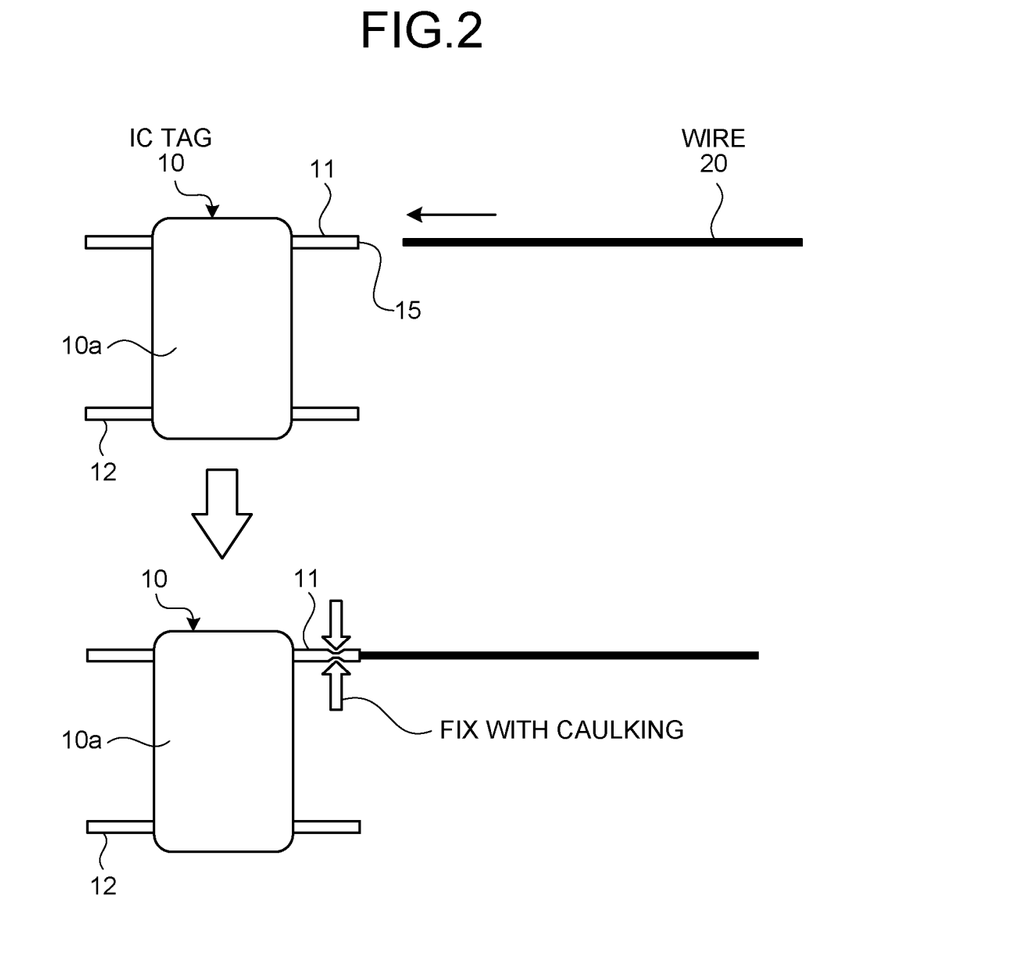
FIG. 2 is an explanatory diagram (1) of a procedure of fixing the IC tag.

Namely, as illustrated in FIG. 2, firstly, one leading edge of the wire 20 is inserted into the inside of the leading edge of the wire guide 11 (through-hole 15) located on one side (upper right side of FIG. 2) of the IC tag body 10a. With the leading edge of the wire 20 thus inserted into the through-hole 15 of the wire guide 11, the leading edge of the wire guide 11 is pressed to the leading edge of the wire 20 by pliers, etc., so that the leading edge of the wire guide 11 is fixed by caulking to the leading edge of the wire 20.

Figure 3:
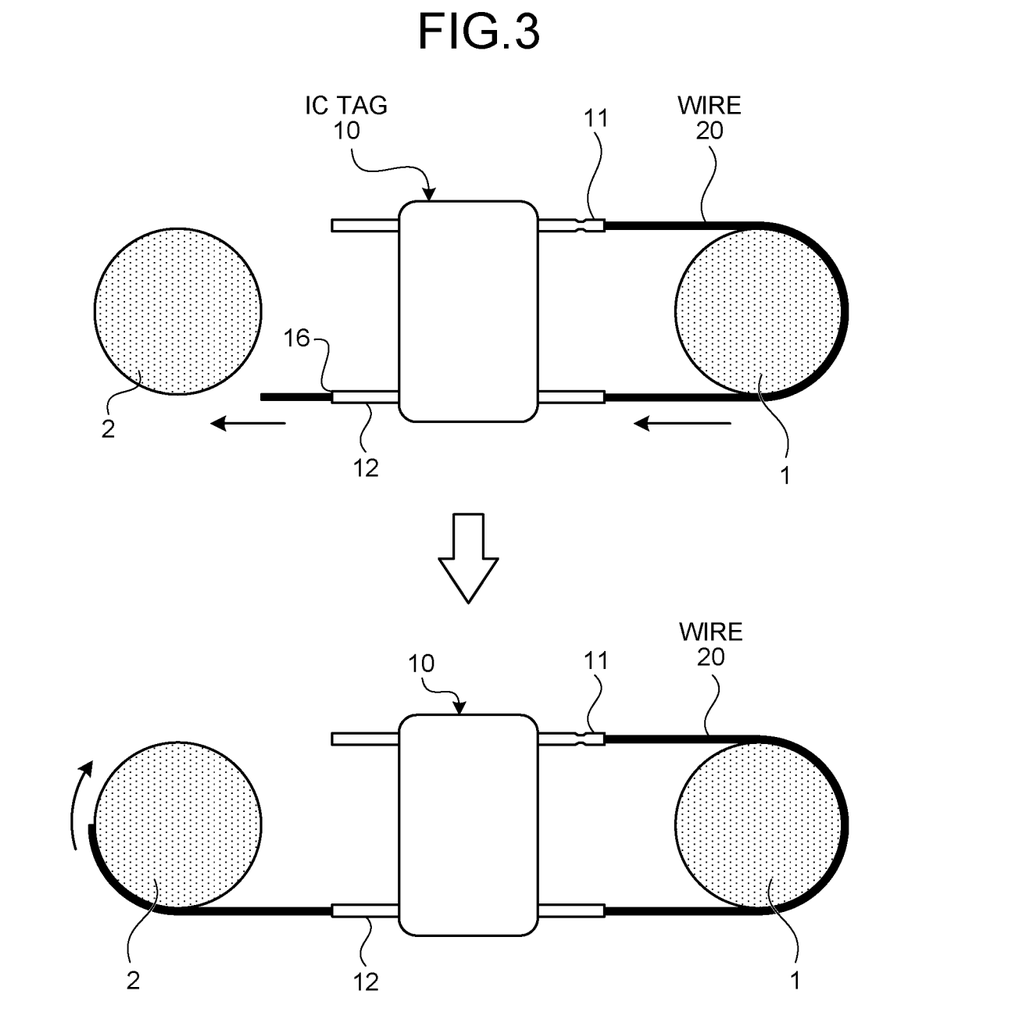
FIG. 3 is an explanatory diagram (2) of the procedure of fixing the IC tag.

Then, as illustrated in FIG. 3, with one part of the wire 20 fixed to the leading edge of the wire guide 11, the other part of the wire 20 is wound around the fixing member l of the object to be controlled, and the leading edge thereof is inserted into the through-hole 16 of the lower wire guide 12. Then, one end of the wire 20 thus inserted into the inside of the wire guide 12 through the through-hole 16 provided on the lower side of the IC tag body 10a is drawn out from the other side (lower left side of FIG. 3) of the wire guide 12. The drawn-out wire 20 is wound around the fixing member 2.

Figure 4:
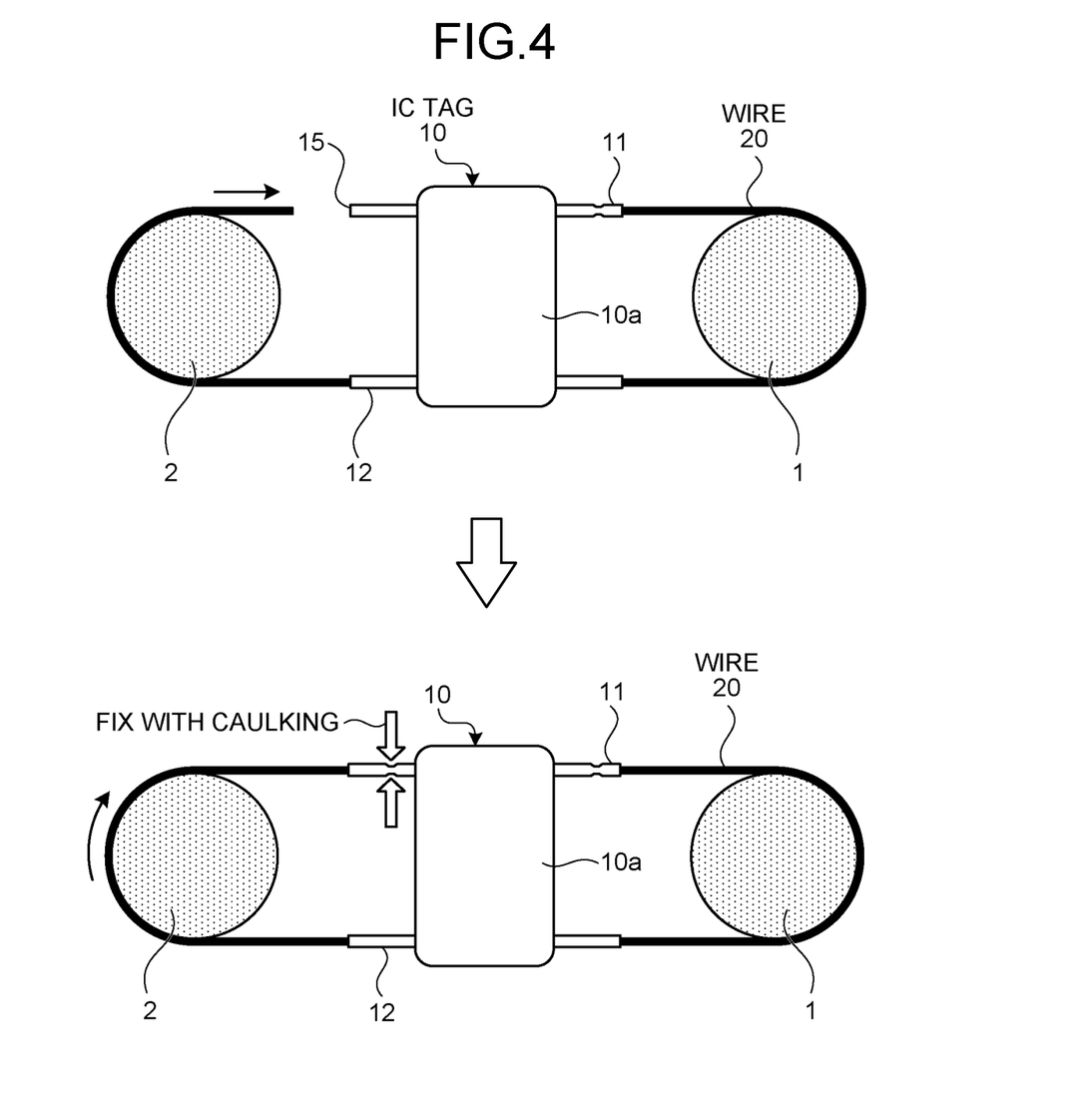
FIG. 4 is an explanatory diagram (3) of the procedure of fixing the IC tag.

Then, as illustrated in FIG. 4, the leading edge of the wire 20 wound around the fixing member 2 is inserted into the through-hole 15 of the wire guide 11 located on the other side (upper left side of FIG. 4) and, with this state, the leading edge of the wire guide 11 is pressed, so that the wire 20 is fixed by caulking to the leading edge of the wire guide 11.

The IC tag 10 fixing procedure including positional adjustment of the IC tag 10 will be explained with reference to FIG. 5. Namely, FIG. 5 illustrates a procedure of adjusting a fixing position of the IC tag 10 fixed to the object to be controlled.

Figure 5:
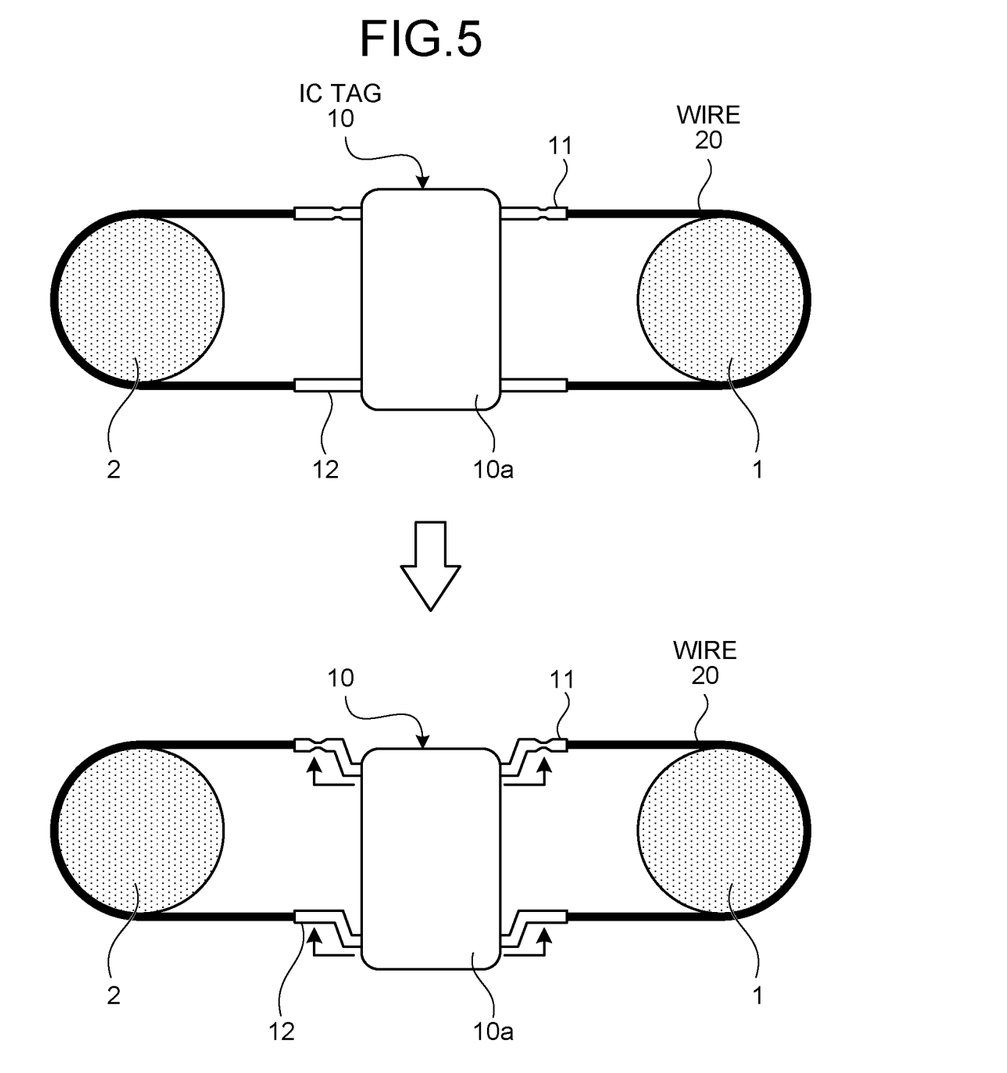
FIG. 5 is an explanatory diagram (4) of the procedure of fixing the IC tag.

As illustrated in FIG. 5, by bending a pair of wire guides 11 and 12 provided on two side faces of the IC tag 10 to a crooked shape, the fixing position of the IC tag 10 may be adjusted according to the location of an obstruction when the obstruction is present on the object to be controlled or at the fixing position of the IC tag 10.

To explain specifically, the wire guides 11 and 12, which are a hollow tube, may easily be bent at any required position and, by bending and moving the wire guides 11 and 12, the fixing position of the IC tag 10 may be adjusted. This enables flexible and secure fixing of the IC tag 10, even if the object to be controlled changes in its size or its positional relationship with the IC tag 10.

The fixing procedures (1) to (4) illustrated in FIGS. 2 to 5 explained above enable the IC tag 10 to be fixed at a predetermined position of the object to be controlled, using the two fixing members 1 and 2 fixedly provided on the object to be controlled. The IC tag 10 thus fixed to the object to be controlled is removed from the object to be controlled by cutting the wire 20 using a specialized cutter, etc.

In the IC tag fixing procedure illustrated in FIGS. 2 to 5 explained above, the fixing of the leading edge of the wire guides 11 and 12 and the wire 20 is performed by the fixing with caulking using the pliers, etc. The manner of fixing, however, is not limited to the above example. The wire 20 may be made of a rubber material (such as rubber string), etc., and in fixing a wire in the form of a rubber string to the leading edge of the wire guides 11 and 12, the wire 20 inserted into the through-holes 15 and 16 of the wire guides 11 and 12 may be fixed by a wedge.

Alternatively, the wire in the form of a rubber string may be wound around, for example, the leading edge of the wire guide 11 for the length equal to that of the wire, and the thus wound rubber string may be drawn out and inserted into the through-holes 15 and 16 of the wire guides 11 and 12, According to the IC tag fixing structure of the first embodiment, by fixing with caulking one end of the wire 20 to one end of the wire guides respectively extending from the upper position and the lower position on each of two side faces of the body 10a of the IC tag 10 and inserting the other end of the wire 20 into the through-holes 15 and 16 of the wire guides 11 and 12, the wire 20 is formed as a loop (ring type).

Because the thus looped wire 20 is wound around the fixing members 1 and 2 of the object to be controlled, the IC tag 10 is fastened between the fixing members 1 and 2, and the IC tag 10 is fixed at a predetermined position of the object to be controlled by the wire 20 stretched between the fixing members 1 and 2, whereby the IC tag 10 is fixed at a predetermined position of the object to be controlled, and the IC tag 10 may constantly be fixed accurately at a predetermined position of the object to be controlled.

--Example of Fixing IC Tag to Tire Wheel--

Figure 6:
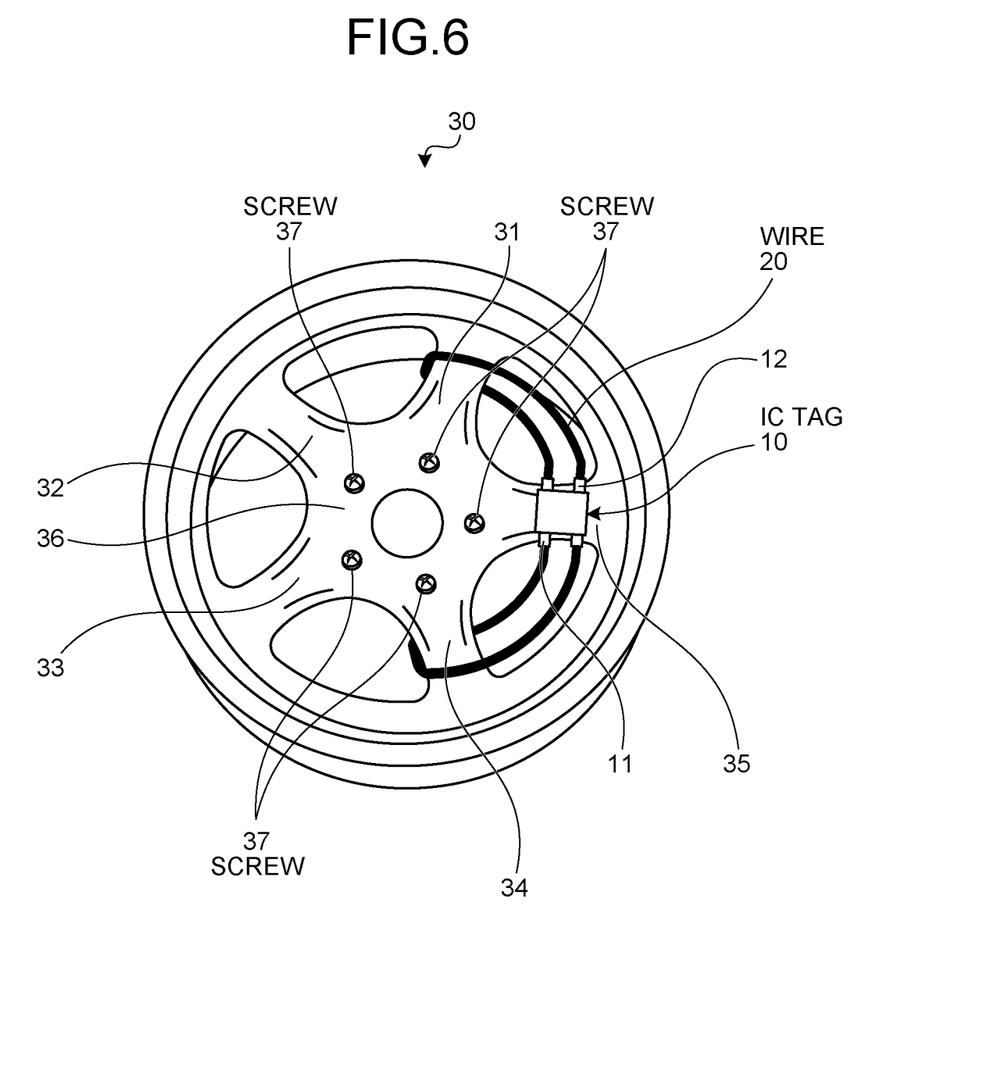
FIG. 6 is an explanatory diagram of an example of a fixed IC tag.

FIG. 6 depicts an example of application of the IC tag fixing structure of the first embodiment to a tire wheel. FIG. 6 is a perspective view of a tire wheel 30 with its wheel cover removed and illustrates an example of fixing the IC tag 10 to the tire wheel 30.

As illustrated in FIG. 6, the use of two spokes (spokes 31 and 34) out of five spokes 31 to 35 making up the tire wheel 30 as the fixing member of the wire 20 enables fixing the IC tag 10 at a predetermined position (position of the spoke 35 in the example of FIG. 6) of the tire wheel 30.

When the IC tag is fixed to the tire wheel 30, the wire 20 respectively extending from the wire guides 11 and 12 are wound around the spokes 31 and 34 to form a loop and fastening the IC tag 10 between the spoke 31 and the spoke

34. Thus, the IC tag 10 may be fixed at a predetermined position (spoke 35) of the tire wheel 30.

When the IC tag 10 is fixed to the tire wheel 30 of an automobile, information on fastening and fixing of five screws 37 for fixing a hub 36 of the tire wheel 30 (history information of manufacturing process) may be obtained, for example.

Specifically, by using an electrically-powered screw driver having an embedded switch to detect the completion of fastening of the screw 37, a receiving part (not shown) of the IC tag 10 may acquire an ON signal (radio wave signal) which is detected when the fastening of the screw 37 is complete, and thus acquire information on the fastening of the screws 37 depending on the number of acquisitions of the ON signal (in other words, depending on a count of the number of fastened screws 37). Thus, the manufacturing process, etc., may be controlled.

[b] Second Embodiment

The IC tag fixing structure according to a second embodiment will be explained referring to FIG. 7. In the fixing structure of the first embodiment, the IC tag 10 is fixed to the object to be controlled by the wire 20 at two fixing positions (fixing members 1 and 2). The second embodiment is characterized in that an IC tag 10A is fixed to the object to be controlled by the wire 20 at plural positions (three locations in FIG. 7).

Figure 7:
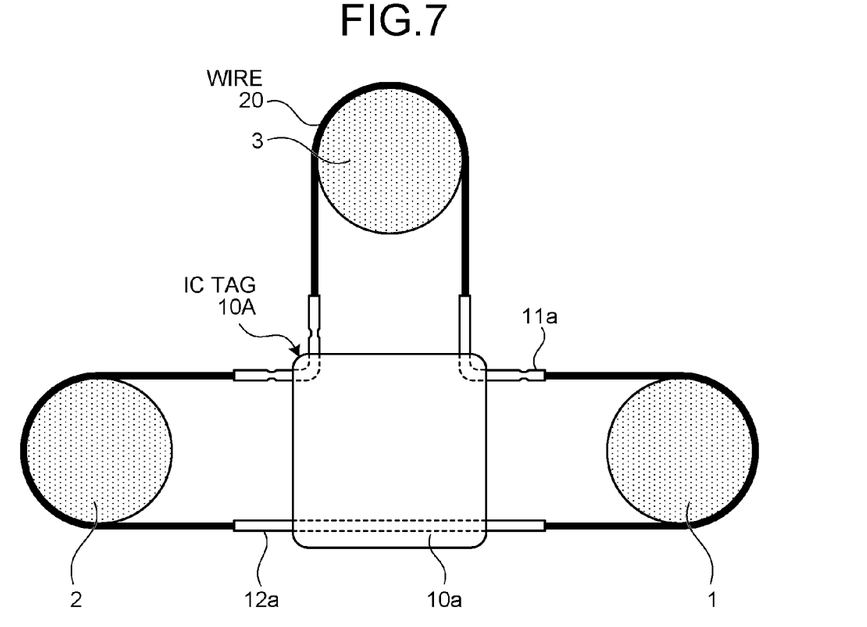
FIG. 7 is a diagram of a configuration of an IC tag according to a second embodiment.

As illustrated in FIG. 7, the IC tag 10A has a pair of wire guides 11a and 12a each extending from a predetermined position (upper and lower positions) on two side faces of the IC tag body 10a. Of two wire guides 11a and 12a, the wire guide 11a is bent at approximately 90 degrees. The bent wire guide 11a enables the wire 20 to be wound and fixed like a loop not only around the fixing members 1 and 2 located at two sides of the IC tag 10A but also around another fixing member 3. Because the IC tag fixing structure according to the second embodiment can use three fixing members 1 to 3, the fixing position of the IC tag 10A can be made more accurate.

[c] Third Embodiment

Figure 8:
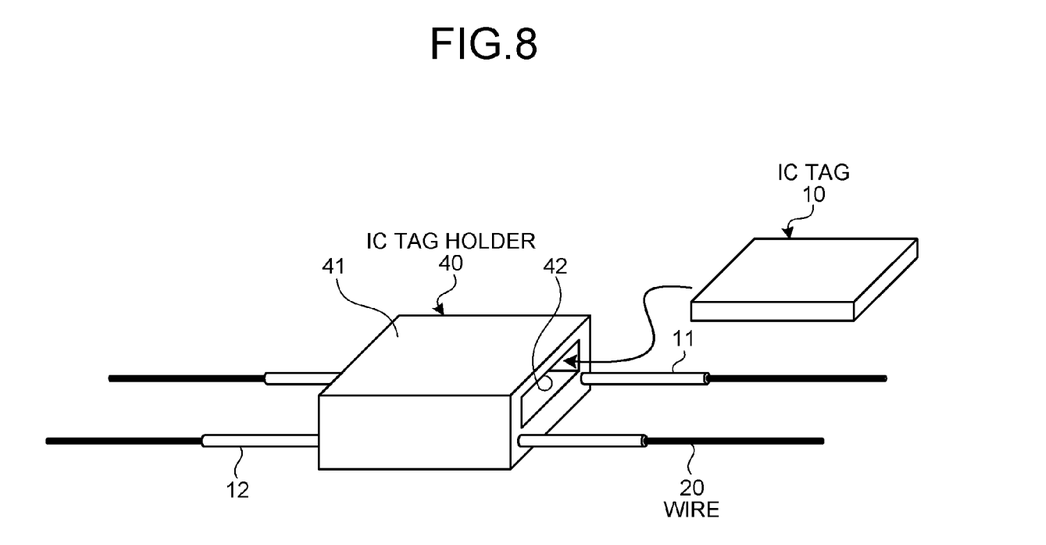
FIG. 8 is a diagram of a configuration of an IC tag holder according to a third embodiment.

An IC tag holder fixing structure according to a third embodiment will be explained referring to FIG. 8. FIG. 8 illustrates a state where the IC tag 10 is storable in an IC tag holder 40. While the first and second embodiments are configured to provide the wire guides 11 and 12 for fixing both ends of the wire 20 directly on the body 10a of the IC tag 10, the third embodiment is characterized in providing the wire guides 11 and 12 in the IC tag holder 40 storing the IC tag 10 inside and fixing the IC tag holder 40 at a predetermined position of the object to be controlled.

As illustrated in FIG. 8, the IC tag holder 40 is configured with a generally quadrilateral, box-type body 41, and a tag storage part 42 that detachably stores the IC tag 10 is formed inside the IC tag holder 40. A pair of wire guides 11 and 12 is provided at a predetermined position (upper and lower positions) of the body 41 of the IC tag holder 40 and the wire 20 is fixed by these wire guides 11 and 12.

While the wire guides 11 and 12 provided in the IC tag holder 40 have the function of fixing one end (leading edge) of the wire 20 and spreading the wire 20 between the fixing members 1 and 2, the wire guides 11 and 12 may simultaneously be used as a member having functions of an antenna for wireless communication, power supply, a memory, etc., as well, in addition to the function as a wire connection guide member.

As explained above, the IC tag holder fixing structure of the third embodiment, which is configured to provide the wire guide 11 for looping the wire 20 in the IC tag holder 40 and store the IC tag 10 in the IC tag holder 40, enables fixing the IC tag holder 40 storing the IC tag 10 inside at a predetermined position of the object to be controlled and in particular, easy exchange of the IC tag in the case of a failure of the IC tag, etc.

[d] Fourth Embodiment

Figure 9:
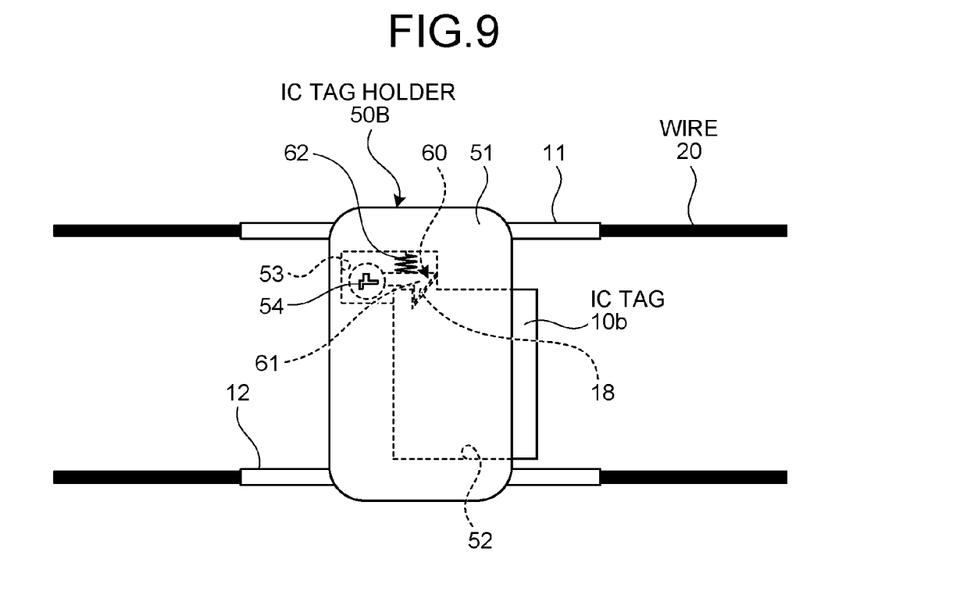
FIG. 9 is a diagram of a configuration of an IC tag holder according to a fourth embodiment.
Figure 10:
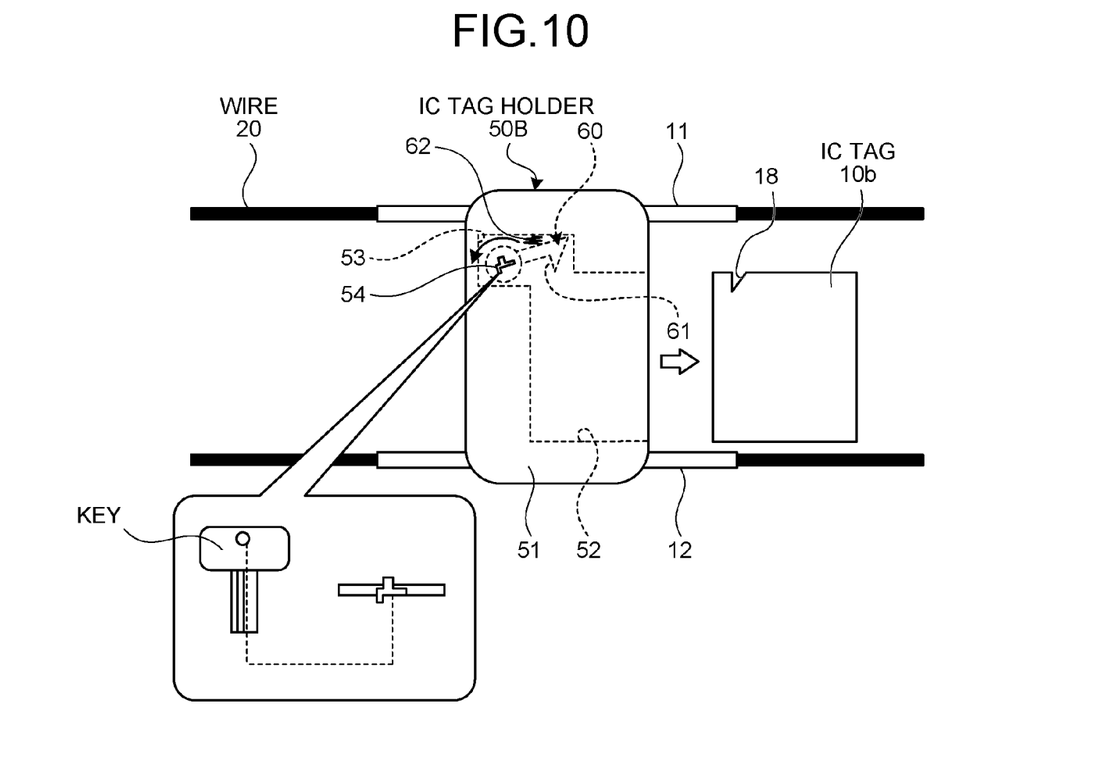
FIG. 10 is a diagram for explaining how a key of the IC tag holder illustrated in FIG. 9 is unlocked.

An IC tag holder fixing structure according to a fourth embodiment will be explained referring to FIGS. 9 and 10. FIG. 9 illustrates a state where an IC tag 10b is stored in an IC tag holder 50B, and FIG. 10 illustrates a state where the IC tag 10b is removed from the IC tag holder 50B. The fourth embodiment is characterized in providing a key mechanism 60 for preventing unauthorized removal of the IC tag 10b at a space 53 formed in an IC tag holder body 51 of the IC tag holder 50B.

As illustrated in FIGS. 9 and 10, a pair of wire guides 11 and 12 are provided on two side faces of the IC tag holder body 51 of the IC tag holder 50B and the key mechanism 60 having a hook 61 and a pressure spring 62 is provided at a predetermined position (upper, back side of a tag storage part 52) of the space 53 of the IC tag holder body 51. On the other hand, an engaging concave part 18 that engages with the hook 61 of the key mechanism 60 is formed at a predetermined position (upper side) of the IC tag 10b to be stored in the tag storage part 52 of the IC tag holder 50B.

In the IC tag holder 50B configured as above, the engagement of the leading edge of the hook 61 of the key mechanism 60 with the engaging concave part 18 of the IC tag 10b enables storing the IC tag 10b inside the tag storage part 52 and fixing the IC tag 10b inside to prevent it from being removed without unlocking of the key mechanism 60.

On the other hand, as illustrated in FIG. 10, at the time of removal of the IC tag 10b from the IC tag holder 50B, for example, for an exchange of the IC tag 10b, a key is used. By putting the key in a key hole 54 and turning the key counterclockwise, the hook 61 of the key mechanism 60 rotates against a pressing force of the pressure spring 62, thereby releasing the engagement of the leading edge of the hook 61 of the key mechanism 60 with the engaging concave part 13 and enabling the IC tag 10b to be removed from the IC tag holder 50B.

As explained above, the IC tag holder fixing structure of the fourth embodiment, which is configured to provide the wire guides 11 and 12 for fixing the IC tag 10b by looping the wire 20 in the IC tag holder 50B storing the IC tag 10b and provide the key mechanism 60 in the IC tag holder 50B, enables fixing the IC tag holder 50B storing the IC tag 10b at a predetermined position of the object to be controlled and securely preventing the unauthorized removal of the IC tag 10b by the key mechanism 60 provided in the IC tag holder 50B.

According to the embodiments, a non-contact storage medium may easily and securely be fixed to a predetermined position of the object to be controlled.

According to the embodiments, the non-contact storage medium may be fixed at a predetermined position by a wire connection member inserted into the inside of a wire connection guide member and furthermore, control of the position relative to the object to be controlled and adjustment of a fixing position of the non-contact storage medium may be performed easily.

According to the embodiments, the wire connection guide member that guides the wire connection member may also be used as an antenna member for performing wireless communication.

According to the embodiments, by bending the wire connection guide member in an arbitrary direction depending on the location of a fixing member of the object to be controlled or a positional relationship with other obstacles, the fixing position of the non-contact storage medium may be adjusted easily.

According to the embodiments, even if the object to be controlled changes in its size or its positional relationship with the non-contact storage medium, fixing of the non-contact storage medium to the object to be controlled may be performed flexibly and securely.

According to the embodiments, a non-contact storage medium holder may securely be arranged at a predetermined position of the object to be controlled.

According to the embodiments, the non-contact storage medium holder may be fixed at a predetermined position by the wire connection member inserted into the inside of the wire connection guide member and furthermore, the control of the position relative to the object to be controlled and adjustment of the fixing position of the non-contact storage medium holder may be performed easily.

According to the embodiments, the wire connection guide member that guides the wire connection member may also be used as the antenna member for performing the wireless communication.

According to the embodiments, by bending the wire connection guide member in an arbitrary direction depending on the location of the fixing member of the object to be controlled or the positional relationship with other obstacles, the fixing position of the non-contact storage medium holder may be adjusted easily.

According to the embodiments, even if the object to be controlled changes in its size or its positional relationship with the non-contact storage medium, attachment of the non-contact storage medium to the object to be controlled may be performed flexibly and securely.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-contact storage medium fixing structure comprising:
   a non-contact storage medium that has a memory unit which stores predetermined information of an object to be controlled;
   two wire connection guide members extending from two different positions respectively on a body of the non-contact storage medium; and
   a wire connection member that fixes the non-contact storage medium at a predetermined position of the object to be controlled, by way of the wire connection guide members, the wire connection guide member being a stick-like member hollow inside with a diameter larger than a diameter of the wire connection member, the wire connection member running through inside the stick-like member hollow formed in the wire connection guide member.

2. The non-contact storage medium fixing structure according to claim 1, wherein
   the wire connection guide member includes an antenna member.

3. The non-contact storage medium fixing structure according to claim 1, wherein
   the wire connection guide member is formed by a material freely bendable in an arbitrary direction.

4. The non-contact storage medium fixing structure according to claim 1, wherein
   the wire connection member is fixed so as to form two or more loops or semi-loops at predetermined positions of the object to be controlled, by way of the wire connection guide members.

5. The non-contact storage medium fixing structure according to claim 1, further comprising
   another wire connection guide members other than the two wire connection guide members, each of the another wire connection guide members extending from different positions on the body of the non-contact storage medium.

6. A non-contact storage medium holder fixing structure comprising:
   a non-contact storage medium that has a memory unit which stores predetermined information of an object to be controlled;
   a non-contact storage medium holder that stores the non-contact storage medium inside;
   two wire connection guide members extending from two different positions respectively on the non-contact storage medium holder; and
   a wire connection member that fixes the non-contact storage medium holder at a predetermined position of the object to be controlled, by way of the wire connection guide members, the wire connection guide member being a stick-like member hollow inside with a diameter larger than a diameter of the wire connection member, the wire connection member running through inside the stick-like member hollow formed in the wire connection guide member.

7. The non-contact storage medium holder fixing structure according to claim 6, wherein
   the wire connection guide member includes an antenna member.

8. The non-contact storage medium holder fixing structure according to claim 6, wherein
   the wire connection guide member is formed by a material freely bendable in an arbitrary direction.

9. The non-contact storage medium holder fixing structure according to claim 6, wherein
   the wire connection member is fixed so as to form two or more loops or semi-loops at predetermined positions of the object to be controlled, by way of the wire connection guide members.

10. The non-contact storage medium holder fixing structure according to claim 6, further comprising
    a key mechanism for preventing unauthorized storage and removal of the non-contact storage medium is provided at a predetermined position of the non-contact storage medium holder storing the non-contact storage medium inside.

11. The non-contact storage medium holder fixing structure according to claim 6, further comprising
    another wire connection guide members other than the two wire connection guide members, each of the another wire connection guide members extending from different positions on the non-contact storage medium holder.

* * * * *